United States Patent [19]

Matsumura et al.

[11] Patent Number: 4,831,483
[45] Date of Patent: May 16, 1989

[54] ABNORMALITY DETECTION ALARM CIRCUIT FOR OUTPUT CIRCUIT

[75] Inventors: Ken Matsumura, Odawara; Hideharu Tezuka, Yokosuka, both of Japan

[73] Assignee: Kabushiki Kaisha Toshiba, Kawasaki, Japan

[21] Appl. No.: 143,015

[22] Filed: Jan. 12, 1988

[30] Foreign Application Priority Data

Jan. 13, 1987 [JP] Japan ................. 62-004191

[51] Int. Cl.⁴ .............. H02H 3/093; H02H 3/20
[52] U.S. Cl. .................... 361/98; 361/101; 361/89; 361/86; 361/87; 323/278
[58] Field of Search .......... 361/91, 92, 93, 94, 361/98, 101, 18, 86, 87, 88, 89, 79, 96; 323/277, 278

[56] References Cited

U.S. PATENT DOCUMENTS

| 4,225,897 | 9/1980 | Kaplan | 361/93 |
| 4,441,136 | 4/1984 | Hampshire | 361/93 |
| 4,503,478 | 3/1985 | Seki et al. | 361/98 |
| 4,528,608 | 7/1985 | Andersson et al. | 361/18 |
| 4,538,198 | 8/1985 | Imanishi et al. | 361/98 |
| 4,564,879 | 1/1986 | Beinstman | 361/98 |

Primary Examiner—A. D. Pellinen
Assistant Examiner—H. L. Williams
Attorney, Agent, or Firm—Foley & Lardner, Schwartz, Jeffery, Schwaab, Mack, Blumenthal & Evans

[57] ABSTRACT

To turn off an output transistor and generate an alarm whenever a load driven by the output transistor is shorted or opened, the abnormality detection alarm circuit comprises a short detection circuit; an open detection circuit; a delay circuit; an output transistor driving circuit; and an alarm circuit. The delay circuit generates a delayed abnormality signal after the short or open detection circuit has kept generating an abnormal signal beyond a predetermined time. Further, a latch circuit is incorporated, to automatically returning the output transistor driving circuit and the alarm circuit to the normal status immediately after the abnormality has been removed.

1 Claim, 3 Drawing Sheets

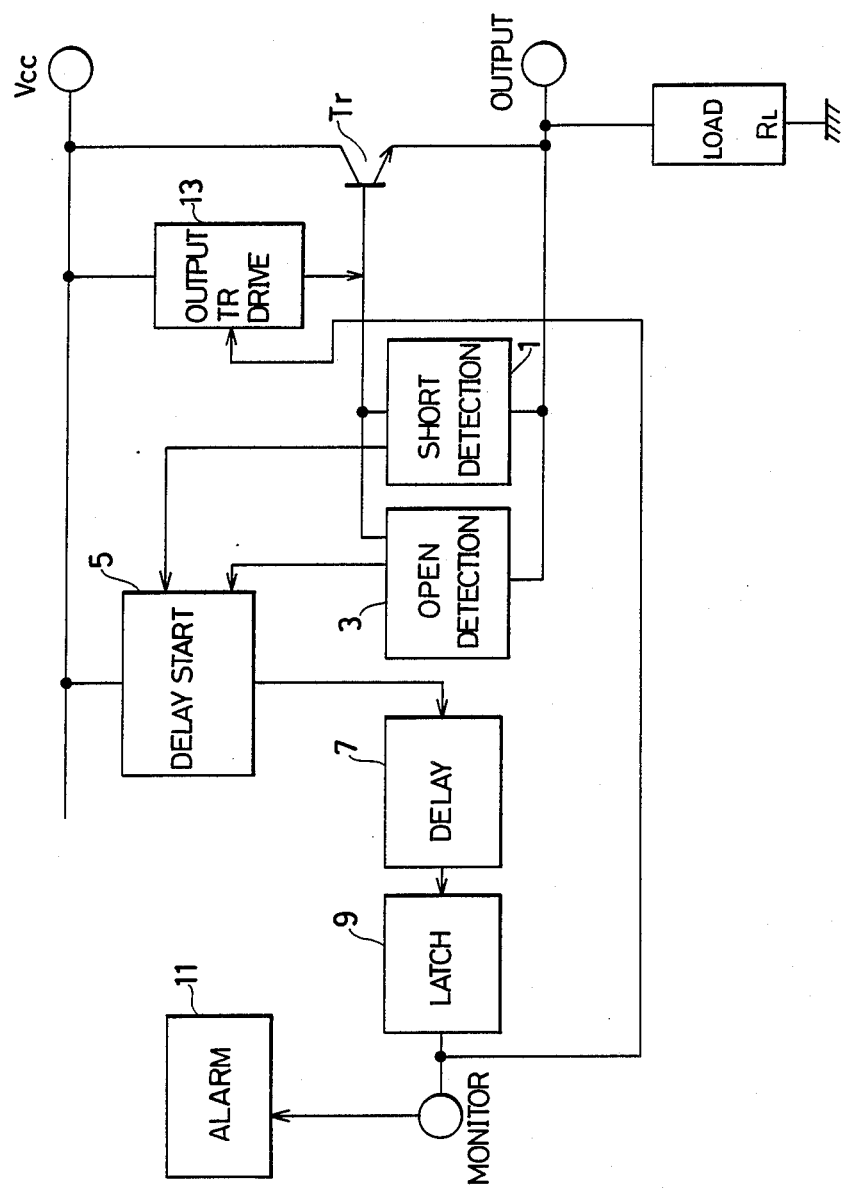
F I G. 1

ABNORMALITY DETECTION ALARM CIRCUIT FOR OUTPUT CIRCUIT

BACKGROUND OF THE INVENTION

1. Field of the Invention

The present invention relates to an abnormality detection alarm circuit for an output circuit, by which an abnormal condition use to an open or short status of a load driven by an output circuit can be detected to deactivate the output circuit for protection, while generating an alarm signal.

2. Description of the Prior Art

Various output circuits with high current drive faculty are connected to an output stage of electronic circuits in order to drive a load coupled to the output stage thereof.

In these output circuits, in case the load is shorted, since an overcurrent higher than the allowable current will be passed through an output transistor constituting an output stage of the circuit, the output transistor will be broken down due to this overcurrent. To protect the output transistor when the load is shorted, a protection circuit is usually incorporated in the output circuit to protect the output transistor from the overcurrent passed through the shorted output transistor.

In these prior-art protection circuits, however, only when the load is shorted, the output transistor is protected from the overcurrent. Therefore, no countermeasure has been taken against such a malfunction that the load is open or approximately in open status (e.g. a load connecting wire is about to be disconnected). In other words, it has been impossible to easily and quickly detect an abnormality or a malfunction of an output circuit (e.g. short or open status of the load) serving as a part of an entire system (e.g. electronic apparatus) and further to restore the abnormal circuit to the normal conditions as quickly as possible.

SUMMARY OF THE INVENTION

With these problems in mind, therefore, it is the primary object of the present invention to provide an abnormality detection alarm circuit for an output circuit, which can detect abnormal load conditions (including both shorted and open load conditions) to protect an output circuit from breakdown due to overcurrent and to allow the output circuit to be restored quickly and automatically to the normal condition immediately after the abnormal load conditions have been removed.

To achieve the above-mentioned object, an abnormality detection alarm circuit for an output circuit for driving a load, according to the present invention, comprises: (a) abnormality detecting means coupled to the output circuit for detecting an abnormality of the load and generating an abnormality detection signal; (b) signal delaying means, coupled to said abnormality detecting means, for generating a delayed detection signal after said abnormality detecting means has kept generating the abnormality detection signal beyond a predetermined time period; (c) output circuit driving means, coupled to said signal delaying means, for deactivating the output circuit in response to the delayed detection signal; and (d) alarm generating means, coupled to said signal delaying means, for generating an alarm signal in response to the delayed detection signal.

Further the abnormality detection alarm circuit of the present invention preferably comprises latch means, coupled between said signal delaying means and said output circuit driving means, said alarm generating means, for generating a first voltage level signal in response to absence of the delayed detection signal and a second voltage level signal in response to presence oF the delayed detection signal.

In the circuit of the present invention, whenever the output circuit develops trouble such as shorted or open load, these abnormalities can be detected to deactivate the output circuit to protect it from breakdown due to overcurrent and simultaneously to generate an alarm to hasten its restoration to the normal condition.

BRIEF DESCRIPTION OF THE DRAWINGS

The features and advantages of the abnormality detection alarm circuit for an output circuit according to the present invention will be more clearly appreciated from the following description of the preferred embodiments of the invention taken in conjunction with the accompanying drawings in which like reference numerals designate the same or similar elements or sections throughout the figures thereof and in which:

FIG. 1 is a schematic block diagram of a first embodiment of an abnormality detection alarm circuit for an output circuit of the present invention;

DETAILED DESCRIPTION OF THE PREFERRED EMBODIMENTS

Figure 2:
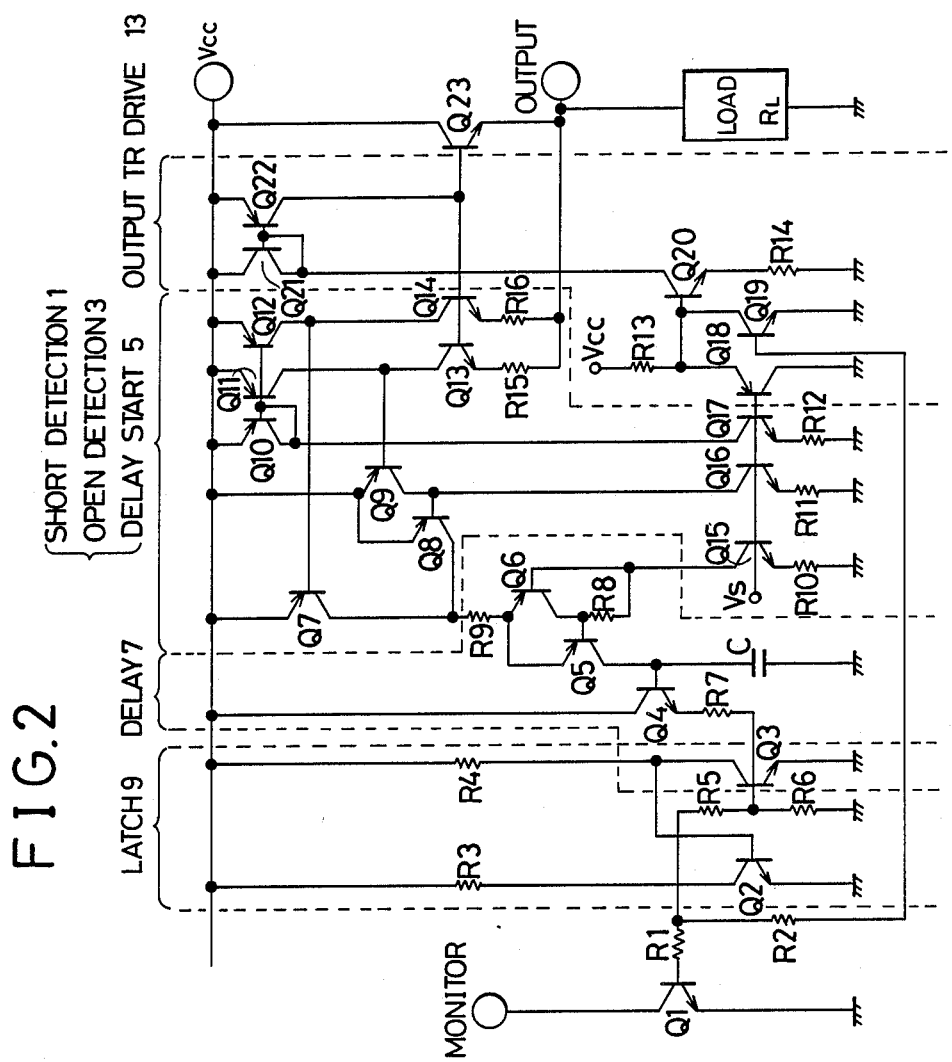
FIG. 2 is a practical circuit diagram corresponding to the block diagram shown in FIG. 1.

Embodiments of the abnormality detection alarm circuit for an output circuit of the present invention will be described in more detail with reference to the attached drawings.

FIG. 1 is a block diagram showing a first embodiment thereof. In the circuit shown in FIG. 1, a load $R_L$ is connected between an output terminal OUT and ground and driven by an NPN-type output transistor Tr connected between a supply voltage Vcc and the output terminal OUT. Further, in case the load $R_L$ is abnormal (open or shorted), this abnormality is detected to protect the output transistor Tr from breakdown due to overcurrent and to alarm the abnormality.

In FIG. 1, the abnormality detection alarm circuit comprises a short detection circuit 1; an open detection circuit 3, a delay start circuit 5; a delay circuit 7, a latch circuit 9, an alarm circuit 11, and an output transistor drive circuit 13.

The short detection circuit 1 is connected between the output terminal OUT and the base terminal of the output transistor Tr in order to detect a shorted condition of the load $R_L$ connected between the output terminal OUT and ground. To detect this shorted condition, a change in potential between the base and emitter of the output transistor Tr caused when the load $R_L$ is shorted is detected to supply a short detection signal to the delay start circuit 5.

The open detection circuit 3 is also connected between the output terminal OUT and the base terminal of the output transistor Tr in parallel to the short detection circuit 1 in order to detect an open condition of the load $R_L$. To detect this open condition, a change in potential between the base and emitter of the output transistor Tr caused when the load $R_L$ is open is detected, in the same way as in the short detection circuit 1, to supply an open detection signal to the delay start circuit 5.

This delay start circuit 5 is connected to the delay circuit 7 to start the operation of the delay circuit 7 in response to a short detection signal or an open detection signal from the short detection circuit 1 or the open detection circuit 3 respectively.

The delay circuit 7 activated by the delay start circuit 5 supplies a delayed short signal or a delayed open signal to the latch circuit 9 when a predetermined delay time has elapsed after a short detection signal or an open detection signal is outputted. This delay circuit 7 is provided to prevent the latch circuit 9 from being erroneously activated in response to noise produced from the short detection circuit 1, the open detection circuit 3, and the delay start circuit 5. That is, a short detection signal or an open detection signal is applied to the latch circuit 9 after the short or open detection signal has been kept outputted beyond a predetermined time period. This delay time of the delay circuit 7 should be so determined that the output transistor Tr is turned off within the time period during which the output transistor Tr is still operating in the stable operation area, in order to protect the output transistor from being broken down due to overcurrent caused when the load $R_L$ is shorted.

When the load $R_L$ is in the normal status, this latch circuit 9 is being reset, in which the output terminal (monitor terminal thereof) is kept at a high voltage level, for instance.

When a short detection signal or an open detection signal is supplied from the delay circuit 7 to this latch circuit 9, the latch circuit 9 latches this signal and is set, in which the output terminal is changed to a low voltage level, for instance.

The alarm circuit 11 is connected to the monitor terminal to indicate an abnormal status of the load $R_L$ by means of sound or light, for instance.

Under the normal conditions, the latch circuit 9 is reset and therefore a high level signal is outputted therefrom. In respect to this high level signal, the output transistor drive circuit 13 drives or activates the output transistor Tr.

In contrast with this, under the abnormal conditions, the latch circuit 9 is set and therefore a low level signal is outputted therefrom. In response to this low level signal, the output transistor drive circuit 13 stops supplying a base current to the output transistor Tr, so that this output transistor Tr is turned fof.

FIG. 2 is a circuit diagram showing a practical circuit configuration of FIG. 1.

In FIG. 2, the latch circuit 9 is composed of NPN transistors Q2 and Q3 and resistors R3, R4, R5 and R6. When the load $R_L$ is normal, the transistor Q2 is turned on but the transistor Q3 is turned off. Therefore, the NPN transistor Q1, whose base terminal is connected to the collector terminal of the transistor Q2 via a resistor R1, is turned off, so that the monitor terminal is at a high voltage level. On the other hand, when the load $R_L$ is abnormal, since the transistor Q2 is turned off and the transistor Q3 is turned on. Therefore, the transistor Q1 is turned on, so that the monitor terminal changes to a low voltage level.

The delay circuit 7 is composed of NPN transistors Q3, and Q4 and PNP transistors Q5 and Q6, resistors R7, R8 and R9, and a capacitor C. The delay time of this delay circuit 7 is a charge time of the capacitor C connected to the base terminal of the transistor Q4. When the delay start circuit 5 begins to operate, the transistors Q5 and Q6 are turned on, so that the capacitor C is charged by a collector current $I_{c5}$ of the transistor Q5.

The collector current $I_{c5}$ can be expressed as $$I_{c5} = I_{c6} \times \exp -(q \times I_{c6} \times R8/KT)$$

because $$V_{BE6} = I_{c6} \times R8 + V_{BE5}$$

where $V_{BE5}$ and $V_{BE6}$ denote base-emitter voltages of the transistors Q5 and Q6; $I_{c6}$ denotes a collector current of the transistor Q6; q denotes an electron change; K denotes the Boltzmann constant; and T denotes an absolute operating temperature.

The short detection circuit 1, the open dectection circuit 3 and the delay start circuit 5 are made up of PNP transistors Q7, Q8, Q9, Q10, Q11 and Q12, NPN transistors Q13, Q14, Q15, Q16 and Q17, resistors R10, R11, R12, R15 and R16. Base terminals of the transistors Q15, Q16 and Q17 are connected to a constant voltage source $V_S$. Each collector current $I_{c15}$, $I_{c16}$ or $I_{c17}$ can be expressed as $$I_{c15} = (V_s - V_{BE15})/R10$$

$$I_{c16} = (V_s - V_{BE16})/R11$$

$$I_{c17} = (V_s - V_{BE17})/R12$$

where $V_{BE15}$, $V_{BE16}$ and $V_{BE17}$ denote base-emitter voltages of the transistors Q11 and Q12 constitutes a mirror circuit in cooperation with the transistor Q10 whose collector terminal is connected to the collector terminal of the transistor Q17, so that the collector current $I_{c17}$ is equal to $I_{C11}$ and $I_{c12}$. On the other hand, to transistors Q13 and Q14 whose base terminals are connected to the output transistor Q12 serve to detect current passing through the output transistor Q23. These collector currents $I_{c13}$ and $I_{c14}$ are expressed as follows:

$$I_{c13} = (V_{BE23} - V_{BE13})/R15$$

$$I_{c14} = (V_{BE23} - V_{BE14})/R16$$

where $V_{BE23}$, $V_{BE13}$ and $V_{BE14}$ are base-emitter voltages of the transistors $Q_{12}$, $Q_{13}$, and $Q_{14}$, respectively.

Figure 3:
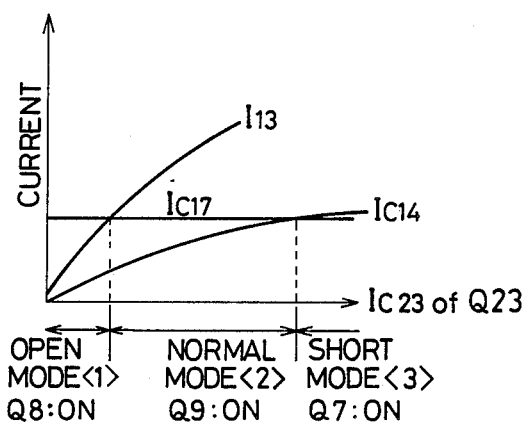
FIG. 3 is a graphical representation for assistance in explaining the operation of the circuit shown in FIG. 2.

Here, it should be noted that collector currents $I_{c13}$, $I_{c14}$ and $I_{c17}$ of the transistors Q13, Q14 and Q17 are determined in relation to a collector current $I_{c23}$ of the output transistor $Q_{23}$, as depicted in FIG. 3, in dependence upon the transistor sizes Q13, Q14 and Q23 and resistors R15 and R16. In more detail, in open or nearly-open status (open mode <1>) where the $I_{c23}$ is excessively low, the transistors Q17, Q13 and Q14 are determined as $I_{c17} > I_{c13} > I_{c14}$; in he normal, status (normal mode <2>) where the $I_{c23}$ is normal the transistors Q17, Q13 and Q14 are determined as $I_{c13} > I_{c17} > I_{c14}$; and in short status (short mode <3>) where the $I_{c23}$ is excessively high, the transistors Q17, Q13 and Q114 are determined as $I_{c13} > I_{c14} > I_{c17}$.

The output transistor drive circuit 13 is made up of transistors Q18, Q19, Q20, Q21 and Q22 and resistors R13 and R14. The transistor Q19, whose base terminal is connected via a resistor R2 to the collector terminal of the transistor Q2 of the latch circuit 9, is controllably turned on or off by the collector potential of the transistor Q2 to control the output transistor Q23.

On the other hand, the collector current $I_{c23}$ of the output transistor Q23 is expressed, when the load $R_L$ is in normal status, as follows:

$$I_{c23} = \{V_{cc} - (V_{BE23} + V_{CES22})\}/R_L$$

where $V_{BE23}$ denotes a base-emitter voltage of the transistor Q23; and $V_{CES22}$ denotes a collector-emitter saturation voltage of the transistor Q22.

With reference to FIG. 3, the operation of the circuit as described above will be described hereinbelow.

(1) Normal mode <2>: $I_{c13} > I_{c17} < I_{c14}$

Under these conditions, the transistor Q7 is turned off and the transistor Q9 is turned on, so that the transistor Q8 is turned off. Since no current flows through the capacitor C, the capacitor C is not charged, so that the transistor Q4 is kept turned off and therefore the delay circuit 7 is inoperative. Accordingly, the transistor Q3 is turned off and the transistor Q2 is turned on, so that the collector potential of the transistor Q2 is set to a low voltage level.

Therefore, the transistor Q1 is turned off, so that the monitor output is at a high voltage level. Further, since the transistor Q19 is turned off, the transistor Q20 is turned on; the output transistor Q23 is also turned on to drive the load $R_L$.

(2) Open mode <1>: $I_{c17} > I_{c13} > I_{c14}$

Under these conditions, since no current is supplied to the base terminals of the transistors Q7 and Q9 because the base current of Q23 is excessively low, the transistors Q7 and Q9 are both turned off, so that the collector current $I_{c16}$ of the transistor Q16 is the base current of the transistor Q8. Therefore, the transistor Q8 is turned on to activate the delay start circuit 5, so that current is supplied to the capacitor C for the collector terminal of the transistor q8 via the transistor Q5 to charge the capacitor C. When the capacitor C is charged up and therefore the base potential of the transistor Q4 rises, the transistor Q4 is turned on and therefore the transistor Q3 is also turned on, so that the transistor Q2 is turned off to set the latch circuit 9. Therefore, current is supplied to the base terminal of the transistor Q1 to turn on the transistor Q1, so that the monitor output changes from a high level to a low level. In response to this low level signal, the alarm circuit (not shown in FIG. 2) connected to the monitor terminal is activated to indicate an abnormality (open status) of the load $R_L$. Further, once the latch circuit 9 is set, the transistor Q19 is turned on and the transistor Q20 is turned off. Therefore, no current is supplied to the base terminal of the output transistor Q23, so that the output transistor Q23 is turned off.

(3) Short mode <3>: $I_{c13} > I_{c14} > I_{c17}$

Under these conditions, the transistor Q7 is turned on and therefore current is supplied to the capacitor C from the transistor Q7 via the transistor Q5, so that the delay start circuit 5 is activated. Therefore, in the same way as when the load $R_L$ is open, the latch circuit 9 is set and therefore the monitor output changes from a high level to a low level, so that an abnormality of the load (short status) is indicated by the alarm circuit 11. Further, the output transistor Q23 is turned off to protect the output transistor Q23 from overcurrent flowing therethrough when the load $R_L$ is shorted.

Figure 4:
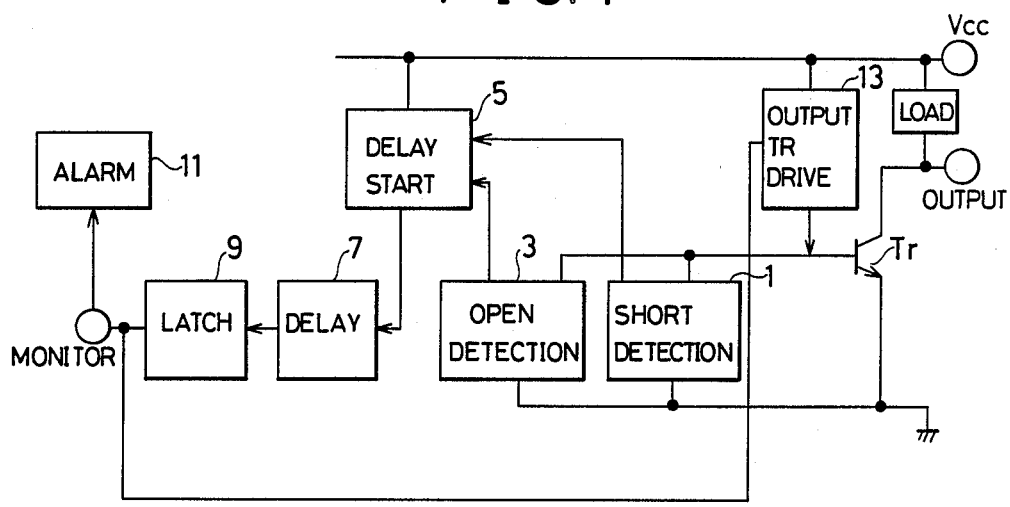
FIG. 4 is a second embodiment of an abnormality detection alarm circuit for an output circuit of the present invention.

FIG. 4 is a block diagram showing a second embodiment of the abnormality detection alarm circuit for an output circuit of the present invention. In this second embodiment, the output transistor Tr is connected between the output terminal OUT and ground, and the load $R_L$ is connected between the supply voltage $V_{cc}$ and the output terminal OUT (called sink drive type). The circuit configuration and circuit operation are quite the same as in the first embodiment (called source drive type) shown in FIG. 1.

In the abnormality detection alarm circuit for an output circuit of the present invention, in case the load is opened or shorted, this abnormality is alarmed to the outside and simultaneously the output transistor Q23 is turned off for protection from breakdown due to overcurrent.

Further, since the latch circuit 9 is set by the delay circuit 7 after the load abnormality is kept detected beyond a predetermined time period, it is possible to prevent erroneous operation of the circuit caused as when the latch circuit 9 is set by internal noise generated from other circuits.

Further, since the collector currents $I_{c13}$, $I_{c14}$ and $I_{c17}$ are determined, as shown in FIG. 3, in relation to the collector current $I_{c23}$, it is possible to detect both load open status and load short status to turn off the output transistor Q23 and to produce an alarm signal, simultaneously.

Further, the types or kinds of the output circuit and the output transistor are not limited to those shown in FIGS. 2 and 4. For instance, the circuit of the present invention can be applied to any output circuit in which PNP transistors are connected in totem pole fashion in which some output transistors are connected in sink-and-source combination drive type manner.

As described above, in the abnormality detection alarm circuit for an output circuit of the present invention, since the abnormal (e.g. open or shorted) status of a load driven by the output transistor can be detected to turn off the output register, while indicating the abnormality to the outside, it is possible to protect the output transistor from being broken down due to overcurrent and to produce an alarm to hasten its restoration to the normal condition. Once the load is restored to the normal condition, since the latch circuit is automatically reset, it is possible to turn on the output transistor into the normal operation status.

What is claimed is:

1. An abnormality detection alarm circuit for an output transistor for driving a load, comprising:
   (a) a short detection circuit, connected between a base terminal and an emitter terminal of the output transistor, for detecting a shorted load and generating a short detection signal;
   (b) an open detection circuit, connected in parallel to said short detection circuit, for detecting an open load and generating an open detection signal;
   (c) a delay start circuit, connected to said short detection circuit and said open detection circuit, for generating a delay start signal in response to any one of the short detection signal and the open detection signal;
   (d) a delay circuit, connected to said delay start circuit, for generating a delayed short signal after said short detection circuit has kept generating the short detection signal beyond a predetermined time during which the output transistor is operating in a stable operation range and a delayed open signal after said open detection circuit has kept generating the open detection signal beyond the predetermined time;

(e) a latch circuit connected to said delay circuit, for generating a first voltage level signal in response to absence of the delayed short signal and the delayed open signal and a second voltage level signal in response to the presence of any one of the delayed short signal and the delayed open signal;

(f) an output transistor driving circuit, connected to said latch circuit and between the base and a collector of the output transistor, for turning off the output transistor when said latch circuit generates the second voltage level signal; and (g) an alarm circuit, connected to said latch circuit, for generating an alarm signal in response to the second voltage level signal.

* * * * *